Jan. 23, 1951   R. J. ASKEVOLD ET AL   2,538,957
REFLUX CONDENSER FOR FRACTIONATING COLUMNS
Filed Dec. 22, 1945
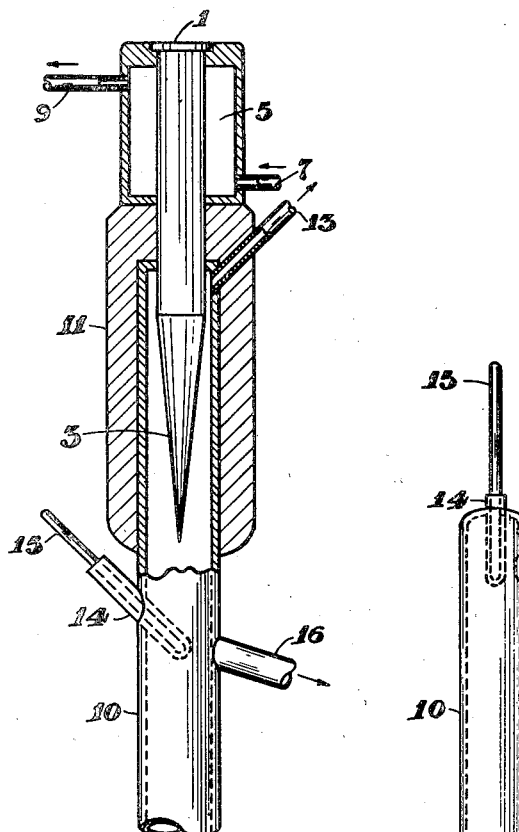
Fig.1
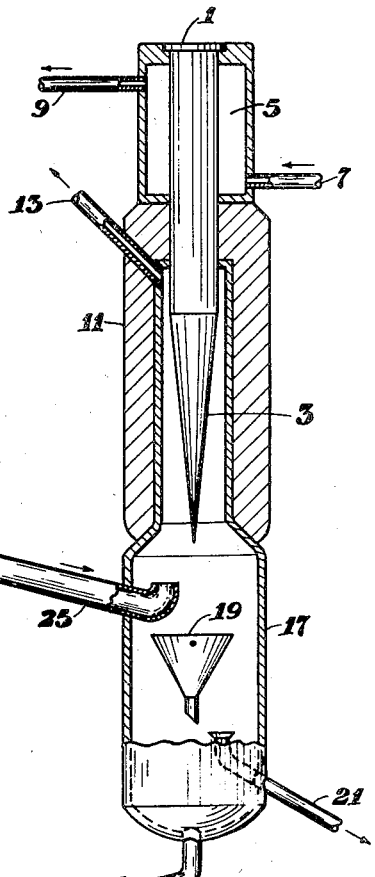
Fig.2
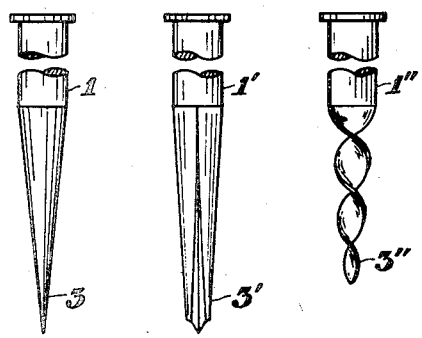
  
Fig.4  Fig.6  Fig.8
INVENTORS
Robert J. Askevold
Carlisle M. Thacker
BY Edward H. Lang
ATTORNEY Patented Jan. 23, 1951

2,538,957

UNITED STATES PATENT OFFICE 2,538,957

REFLUX CONDENSER FOR FRACTIONATING COLUMNS

Robert J. Askevold, Skokie, and Carlisle M. Thacker, Highland Park, Ill., assignors to The Pure Oil Company, Chicago, Ill., a corporation of Ohio Application December 22, 1945, Serial No. 636,758

7 Claims. (Cl. 261—11)

1

This invention relates to reflux condensers for use in connection with fractionating apparatus and more particularly to a reflux condenser for use in connection with laboratory fractionating apparatus.

In laboratory type fractionating apparatus, it is common practice to provide a partial or total condenser to condense vapors and to provide means for returning all or a portion of the condensate as reflux to the fractionating column while withdrawing another portion of the condensate, thereby maintaining a definite and constant reflux ratio. One such method of maintaining a constant reflux ratio in a total condenser is shown and disclosed in the article by Johannes H. Brun, on pages 187 and 188 of Industrial and Engineering Chemistry for April 15, 1930. Another type of condenser and reflux proportioner is shown and disclosed in the patent to Carter, No. 2,251,185. The disadvantage in the type of condensers shown in the article and patent above referred to is that the reflux is cooled to a temperature below the temperature of the vapor. Better fractionation is obtained by using hot reflux in the fractionating column, that is, in using reflux from which has been extracted only the heat of vaporization from the vapors without extraction of sensible heat from the condensate.

An object of our invention is to provide an improved method for fractionating and condensing vapors.

Another object of the invention is to provide an improved apparatus for fractionating and condensing vapors.

Still another object of the invention is to provide condensing apparatus capable of cooling vapors to condensate without extraction of sensible heat from the condensate.

A still further object of the invention is to provide method and apparatus for supplying reflux condensate to a fractionating column at a temperature substantially the same as the temperature of the vapors undergoing fractionation.

Other objects of the invention will become apparent from the following description and drawing of which Figure 1 is a vertical view partly in cross-section and partly diagrammatic of a total condenser illustrating the invention as applied to reflux condensation with vapor phase

2 product withdrawal; Figure 2 is a vertical view partly in cross-section of a total condenser illustrating the invention as applied to a somewhat different type fractionating operation where all vapors coming from the fractionating section are condensed and product is withdrawn as a liquid; Figure 3 is a diagrammatic, elevational view of an element of the condenser shown in Figures 1 and 2; Figure 4 is a plan view of the elements shown in Figure 3 looking upwardly from the bottom thereof; Figure 5 is a diagrammatic, elevational view of a modified form of element showing part of the condenser in Figures 1 and 2; Figure 6 is a plan view of the element shown in Figure 5 looking upwardly from the bottom thereof; Figure 7 is a diagrammatic, elevational view of a still different modification of an element of the condenser shown in Figures 1 and 2; and Figure 8 is a plan view looking upwardly from the bottom of the element shown in Figure 7.

Referring more particularly to Figure 1 of the drawing, numeral 1 indicates a cooling member having a tapered, lower end 3 terminating in a point. The upper portion of element 1 as shown in Figures 1, 2, and 3 is cylindrical and the lower portion is in the form of an inverted cone. Element 1 may be made of any material of good heat conductivity, such as copper, and may be either hollow or solid.

The upper end of the element 1 is surrounded by a jacket 5 having a fluid inlet 7 and a fluid outlet 9 in order to permit circulation of the cooling fluid around the upper portion of element 1. Any suitable cooling fluid such as water may be used. The jacket 5 may be made of suitable material preferably of the same material as element 1 and it is integrally mounted on the outer wall of the element 1.

The element 1, as shown in Figure 1, is mounted in the upper end of a fractionating column 10. The upper end of column 10 surrounding element 1 is insulated as indicated by the numeral 11 from the surrounding atmosphere and from the jacket 5. A vent 13 is provided at the upper end of the column 10 to permit withdrawal of any uncondensed vapor or gas thereby preventing pressure from building up in the column.

The thermometer well 14 in the upper part of the fractionating column 10, immediately below the bottom of the element 1, is adapted to receive a thermometer 15 and permit observation of the temperature of the vapor at the vapor outlet 16 which may be connected to a final condenser and collector.

Referring now to Figure 2, the elements 1, 3, 5, 7, 9, 10, 11, 13 and 15 are the same as those referred to in connection with Figure 1. However, instead of building the condensing unit on top of the fractionating column, the condenser is built on top of a condensate receiving section 17 containing a swinging funnel 19, directly below the point of the element 3 in order to receive condensate. The swinging funnel may be a magnetically operated funnel, such as shown in Carter Patent No. 2,251,185. In one position of the swinging funnel, the condensate flows into the withdrawal line 21 which is connected to a suitable storage vessel. In the normal vertical position of the funnel 19, condensate drops down to the bottom of the condensate receiving section and is returned as reflux through line 23 to the upper portion of fractionating column 10. The upper end of the fractionating column 10 is connected by vapor passage 25 to the condenser at a point between the bottom of the element 1 and the funnel 19. The thermometer 15 is placed in the upper end of the fractionating column 10 at the vapor outlet.

Instead of using a cylindrical condensing element 1 with an inverted conical bottom as shown in Figures 1, 2, 3 and 4, the element 1', shown in Figure 5, may be substituted therefor. This element has a lower tapered end 3' with longitudinal grooves 27 formed therein so that the lower end of the element corresponds more or less to a series of circularly arranged tapered fins.

Still another modification, 1", of condensing element 1, is shown in Figure 7. In this modification, the lower end 3" of the condensing element is in the form of a tapered spiral.

It will be seen from the aforesaid description and drawing that the vapor undergoing condensation does not come in contact with the cooling medium or with that portion of the cooling element that contacts the cooling medium. Instead the cooling element is cooled externally and the portion of the cooling element exposed to the vapor will therefore be of gradually decreasing temperature from bottom to top. Thus, the cooling elements 1, 1' or 1" present a progressively cooler condensing surface as the vapors progress over it, due to both the shape of the member and the manner in which it is cooled.

In fractionating operations using our novel condensing device, the rising vapors will have heat extracted therefrom as soon as they contact the bottom tip of the elements 1, 1' or 1". Any condensate that forms and drips from the end of the element, being bathed with the rising vapors during this process. Vapors which are not condensed upon contacting the bottom of the cooling element, progress upwardly in the gradually narrowing annular space between the insulated wall and the cooling member and are progressively condensed. As a result thereof, condensate formed on a higher portion of the cooling element and flowing downward over the surface thereof may be lower in temperature than the rising vapors, but will be heated during this flow down the wall of the member to substantially the temperature of the vapors.

By providing a condensing element, the temperature of which is gradually lower in the direction of the flow of the vapors and which gradually presents more condensing surface in the direction of the flow of vapors, only sufficient cooling surface is presented to the vapors to condense the vapors without substantially extracting sensible heat from the condensate. If the tip of the member does not present enough cooling surface, for condensation, the uncondensed vapors will rise to a point on the member where the temperature is sufficiently low to condense the vapors.

The invention is not limited to the particular apparatus described and shown, but is commensurate in scope with the objects herein stated and the claims appended hereto.

It is claimed:

1. A vapor condenser comprising, walls defining a vapor space, means for admitting vapors to said space, a cooling element of high thermal conductivity having a portion extending into said vapor space and a portion outside of said vapor space, the portion of said cooling element enclosed in said vapor space being of graduated cross sectional area along its length to form a condensing surface, and means for cooling the exposed portion of said cooling member to induce heat flow from said condensing surface longitudinally out from the vapor space.

2. A vapor condenser comprising, walls defining an elongated enclosed vapor space, means for feeding vapors to said space, a vertically disposed cooling element extending downwardly into said space, said element having high heat conductivity, a portion of said element extending outside said space and surrounded by a jacket through which coolant can be circulated, insulating means surrounding said walls in the vicinity of said cooling element whereby to insulate said space from the surrounding atmosphere and from said jacket, said element having a portion inside said space of gradually increasing surface in the direction of vapor flow through said space.

3. A vapor condenser in accordance with claim 1 in which the portion of the element located within the enclosed space corresponds in shape to an inverted cone.

4. A vapor condenser in accordance with claim 1 in which the portion of the element located within the enclosed zone is in the form of tapered fins.

5. A vapor condenser in accordance with claim 1 in which the portion of the element located within the enclosed zone is in the form of a tapered helix.

6. A vapor condenser comprising heat insulated walls defining an enclosed vapor space, means for feeding vapors to said space, a cooling element of high heat conductivity extending vertically downward into said space so as to provide an annular vapor space between said element and the surrounding wall of said enclosed space, said annular space decreasing in cross-section from the bottom toward the top of said element, a portion of said element extending outside said enclosed space and means for cooling said last mentioned portion without substantially cooling the portion of said element extending into said enclosed space other than by conduction from the cooled outside portion of the element.

7. A vapor condenser comprising walls defining a confined vapor space, means for admitting vapors to said space from a fractionating zone, an elongated cooling element of high thermal conductivity having a portion extending longitudinally through the top wall of said vapor space and a portion of said cooling element being outside the top wall of said space, means for applying cooling medium to only that portion of the element outside said top wall of said space whereby to establish a temperature gradient on the surface of the portion of said cooling element within said space, decreasing continually in the direction of vapor flow through said space, and means for returning condensate from said space to said fractionating zone.

ROBERT J. ASKEVOLD.
CARLISLE M. THACKER.

REFERENCES CITED

The following references are of record in the file of this patent:

UNITED STATES PATENTS

| Number | Name | Date |
|---|---|---|
| 1,390,783 | Hering | Sept. 13, 1921 |
| 1,977,731 | Masury | Oct. 23, 1934 |
| 2,020,298 | Carothers | Nov. 12, 1935 |
| 2,415,411 | Bowman | Feb. 11, 1947 |